Jan. 13, 1931.  J. GRÖNE  1,788,830

TACHEOMETRIC TELESCOPE

Filed Feb. 4, 1929

Inventor:
Josef Gröne

Patented Jan. 13, 1931

1,788,830

UNITED STATES PATENT OFFICE

JOSEF GRÖNE, OF HAMBORN, GERMANY, ASSIGNOR TO THE FIRM CARL ZEISS, OF JENA, GERMANY

TACHEOMETRIC TELESCOPE

Application filed February 4, 1929, Serial No. 337,458, and in Germany February 9, 1928.

The invention relates to a tacheometric telescope and consists therein that such telescope is connected with a double-angled prism serving the purpose of finding the foot of the perpendicular dropped from any point on the connecting line of two polygon points. The new device renders feasible in a simple way the measuring of the ordinates in short range surveying according to the method of the right-angled co-ordinates for which purpose up to the present tape and measuring stave were applied.

The arrangement is suitably made in such a way that the double-angled prism is supported by the tacheometric telescope, whereby, for the sake of making the construction as simple as possible, it is further advisable to rigidly connect the two parts in such a manner that the aiming line of the telescope is lying, on one hand, approximately in that plane to which the two prisms of the double angled prism are lying symmetrically and is, on the other hand, parallel to the main intersecting planes of the prism. As double-angled prism the well-known arrangement consisting of two pentaprisms is specially suitable, whereas as tacheometer appropriately one of the well-known double-image tacheometers is applied. The foot of the telescope is conveniently given such a form that a turning of the telescope by 90° is made noticeable by notches.

Figure 1:
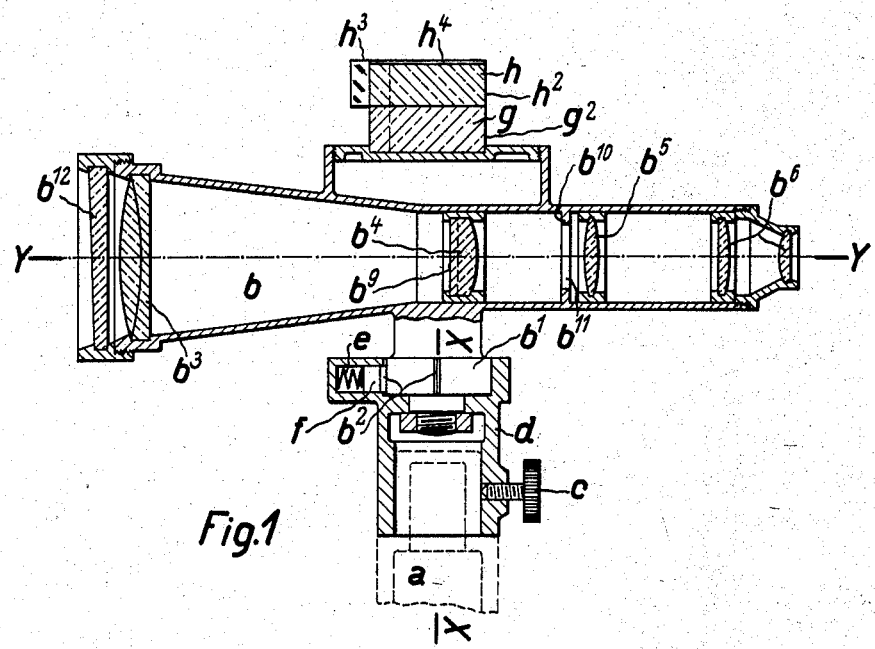
Figure 2:
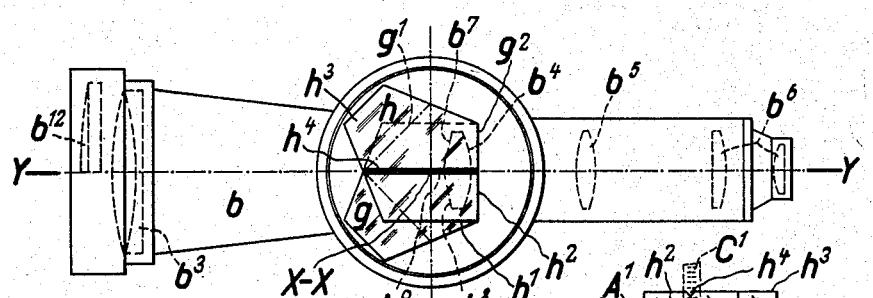
Figure 3:
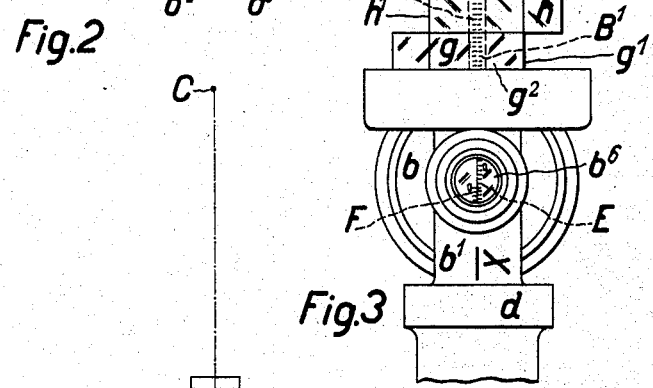
Figure 4:
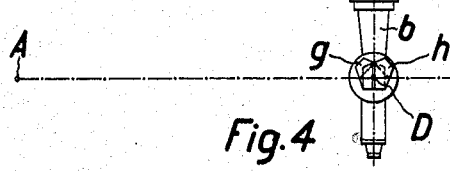

Figures 1 to 3 of the drawing show a constructional example of the invention. Fig. 1 is a vertical section through the optical axis of the tacheometric telescope, Fig. 2 is a plan view, and Fig. 3 a lateral view. Fig. 4 serves the purpose of explaining the surveying method in question.

By a stave $a$ the axis X—X of which is supposed to be perpendicularly adjusted, a tacheometric telescope $b$ is supported on its foot $b^1$ in the following manner: In a sleeve $d$ which can be clamped tight by a set screw $c$ and is rotatable on the axis X—X of the perpendicular stave $a$, there is provided a lock $f$ which is slidable perpendicularly to the axis X—X and can be made to catch in one of the three notches $b^2$ of the foot $b^1$ when the telescope is turned on the axis X—X and the sleeve $d$ is in fixed position, of which notches $b^2$ always two are placed at angles of 90° one from another. The telescope $b$ contains an objective $b^3$, a collective $b^4$, a reversing lens $b^5$ and an eyepiece $b^6$. From that side of the objective $b^3$ which is facing the collective $b^4$ there are ground out two plane surfaces $b^7$ and $b^8$ of which the common intersecting line $b^9$ is lying in the focal plane of the telescope $b$ and at the same time is parallel to the axis X—X and is intersecting the optical axis Y—Y of the telescope. With regard to the plane determined by this intersecting line and the optical axis of the telescope, these two surfaces are symmetric and have such an inclination to the said plane that the two equal images of the entrance pupil lying next to the reversing prism $b^5$ are displaced to each other on the focus of the image plane. In this image plane there is arranged a diaphragm $b^{10}$ of which the free aperture $b^{11}$ has a diameter equal to half the diameter of these images of the entrance pupil. In front of that half of the objective $b^3$ which, seen from the surveyor at the eyepiece $b^6$, is the one to the right, a wedge $b^{12}$ is arranged in such a manner that the rays entering this half are deflected parallel to the intersecting line $b^9$ of the two wedge surfaces $b^7$ and $b^8$ of the collective $b^4$.

The effect of the deflection is shown in Fig. 3. The telescope $b$ aiming at a stave, the surveyor will see two images E and F of the stave, which are separated from each other by a sharp division line. The product of the reciprocal distance from each other of the images of one and the same graduation line of the stave and a constant peculiar to the telescope gives the distance of the stave from the place of the telescope.

On the telescope $b$ two pentaprisms $g$ and $h$ are tightly arranged one above the other similar to a double-angled prism in such a way that the plane to which the two prisms have a symmetric position, on one hand contains the turning axis X—X and on the other hand the optical axis Y—Y of the telescope $b$. Consequently, the ray entrance surface $g^1$ of the lower prism $g$ and the ray entrance surface $h^1$ of the upper prism $h$ are parallel to this plane, whereas the ray outlet surfaces $g^2$ and $h^2$ of the prisms are in a common plane which is perpendicular to the optical axis Y—Y of the telescope $b$. In the upper prism $h$, on its upper bounding surface $h^3$, there is milled a channel $h^4$ in such a way that an aiming line is given which is parallel to the optical axis Y—Y of the telescope $b$ and at the same time intersects the turning axis X—X of the telescope.

The application of the device is the following: Measuring staves having been erected on the two end points A and B of a base line AB and on a point C of which the right-angled co-ordinates should be determined, and the foot $b^1$ of the telescope $b$ having been turned in the sleeve in such a way that the lock $f$ has been caught in the middle-one of the three notches of the foot $b^1$ of the telescope, the perpendicular rod $a$, the set screw having been loosened previously, is to be brought into such a position and the sleeve $d$ turned in such a way to the perpendicular stave $a$ that (compare Figures 3 and 4) the image $A^1$ of the stave erected on A, which will present itself to the surveyor through prism $h$ and the image $B^1$ of the stave erected on B, which will present itself to the surveyor through prism $g$, as well as the stave $C^1$ erected on C which is seen direct above the prisms, are in one straight line which perpendicularly intersects the channel $h^4$. Then, the axis X—X of the perpendicular stave $a$ contains the foot D of the perpendicular from C on AB and the telescope is aiming at the stave $C^1$. The telescope being in this position, the set-screw $c$ is to be fastened. Thereupon, by means of the telescope $b$, the measuring of the ordinates CD has to take place. This done, the telescope must be turned in counter-clockwise direction in the sleeve $d$ in such a manner that the lock $f$ will catch in one of the two notches $b^2$ whereupon the telescope is aiming at the stave erected on point A and, now, the abscissa AD is to be measured. When the telescope is turned again and that by 180° in the sleeve $d$, the lock will catch in the third of the three notches $b^2$ and the telescope is aiming at the stave erected on point B and, now, the measuring of the abcissa BD has to be done.

I claim:

A tacheometric telescope, two angular prisms arranged one above the other on the telescope, each of the prisms being adapted to deflect by 90° a ray passing through it, the ray inlet surfaces of the two prisms being parallel to each other and constituting faces opposite to each other and lying parallel to the optical axis of the telescope, and means to connect the two prisms tightly with the telescope.

JOSEF GRÖNE.